W. TURNBULL.
OILING SYSTEM FOR TRANSMISSIONS.
APPLICATION FILED MAY 25, 1918.

1,429,466.

Patented Sept. 19, 1922.
2 SHEETS—SHEET 2.

INVENTOR.
William Turnbull
BY
Strong & Townsend
ATTORNEYS

Patented Sept. 19, 1922.

1,429,466

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

OILING SYSTEM FOR TRANSMISSIONS.

Application filed May 25, 1918. Serial No. 236,525.

*To all whom it may concern:*

Be it known that I, WILLIAM TURNBULL, a citizen of the United States, residing at Peoria, in the county of Peoria and State of Illinois, have invented new and useful Improvements in Oiling Systems for Transmissions, of which the following is a specification.

This invention relates to a power transmission mechanism, and particularly pertains to an oiling system especially adapted for use with a transmission of the type disclosed in my copending application entitled "Tractor transmission", filed May 25th, 1918, Ser. No. 236,527.

It is the prime object of the present invention to provide an oiling system of portable and unitary construction, which may be assembled in conjunction with the power transmission mechanism of a transmission of the type above referred to, and which mechanism and oiling system are arranged to be removed and replaced within the case as an assembled unit.

In carrying out the present invention, the use of a gear pump of rotary construction is contemplated, this pump being securely connected to the removable portion of the transmission and provided with induction and eduction pipes, the former extending downwardly into a drain well at the bottom of the tank and the latter extending upwardly to be provided with delivery pipes, by which the oil from the pump is sprayed over the moving parts of the machinery. All of said parts are securely connected to each other and are held in such a manner as to be removed with the transmission mechanism without disassociating or otherwise injuring their connections.

The invention is illustrated, by way of example, in the accompanying drawings, in which—

Figure 1:
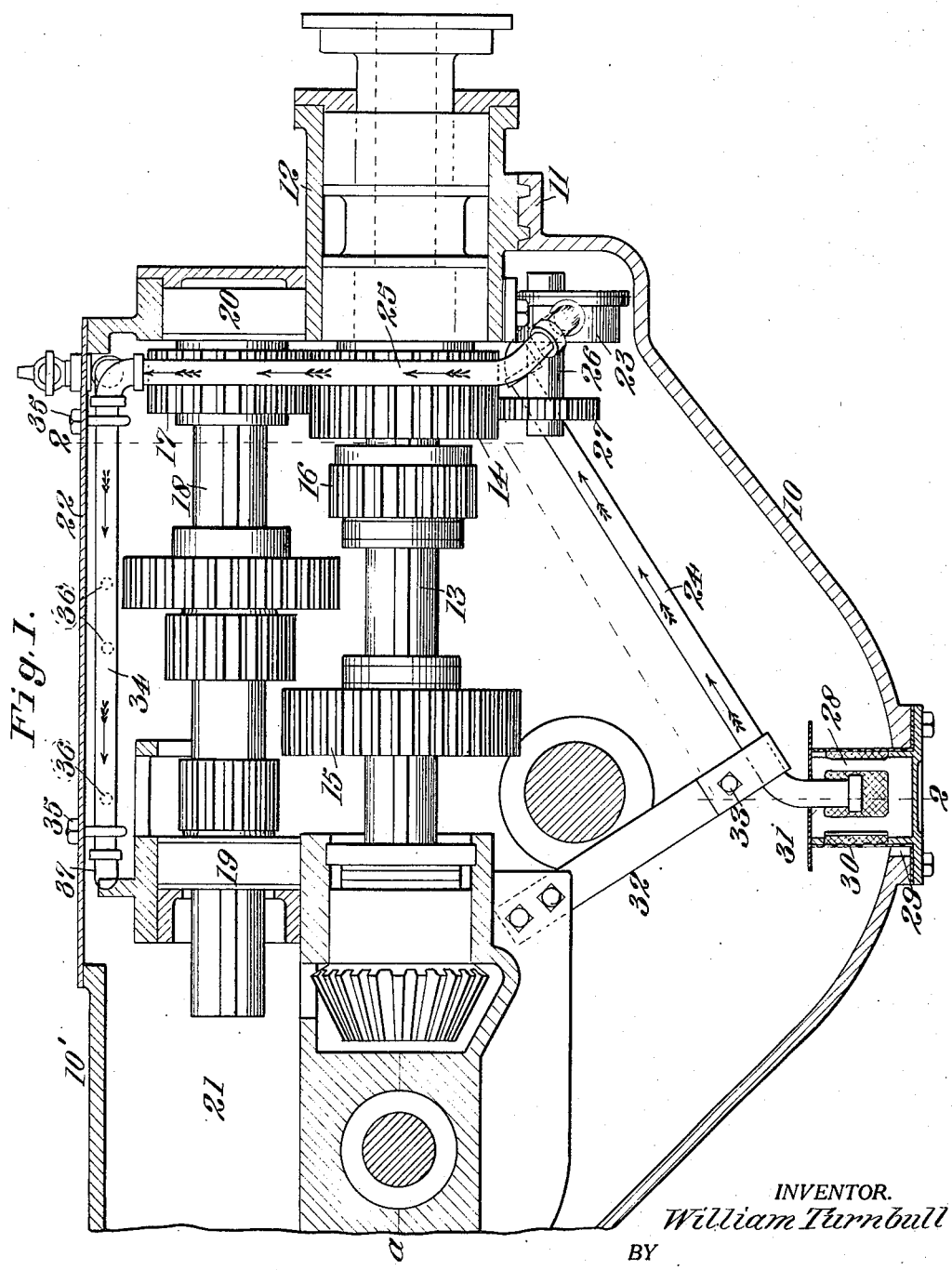
Fig. 1 is a view in section and side elevation, illustrating the completely assembled transmission and more particularly disclosing the disposition of the oiling system within the case thereof.

Referring more particularly to the accompanying drawings, 10 indicates the lower casting of a transmission mechanism, here shown as formed with semicircular end journals 11 which are adapted to receive bearing sleeves 12 within which the main shaft 13 of the mechanism is journaled. The shaft 13 is provided with a fixed gear 14 and a pair of sliding gears 15 and 16 of different diameters. The fixed gear 14 is in constant mesh with a gear 17 mounted upon an auxiliary shaft 18. This shaft is parallel with the main shaft 13 and is driven thereby. The auxiliary shaft is provided with suitable gears which may mesh with the sliding gears 15 and 16, when desired.

The shaft 18 is directly mounted within anti-friction bearings 19 and 20 which are carried by the removable casing portion 21 of the transmission. A cover plate 22 is secured over an opening in the top of this casing and permits access to all of the gears when they are not to be removed from the case.

It will be understood that the construction and arrangement of the parts of the transmission are immaterial and that the present invention is particularly concerned with the oiling system enclosed within this case. This oiling system comprises a rotary pump 23, here shown as of the gear type, an induction pipe 24 and an eduction pipe 25. The gear pump is suitably secured by its housing to the underneath side of the bearing sleeve 12 and is provided with an inwardly and horizontally extending drive shaft 26 which carries a driving pinion 27. The pinion 27 is in constant mesh with the main driving gear 14, previously described as secured to the shaft 13. The pump is arranged so that its induction and eduction ports are disposed in horizontal alignment and upon diametrically opposite sides of the pump casing. The induction port is in direct communication with the pipe 24. This pipe extends obliquely upwardly from a strainer well 28 and is formed with a downwardly bent portion at its lower end to extend vertically into this strainer, while its upper end is formed with an elbow which is disposed above the horizontal level of the port and is turned downwardly to communicate therewith. The strainer well 28 is in the form of a cylindrical hollow casting having an enlarged circular bottom flange by which it is secured through a drain opening 29 in the bottom of the casing member 10.

The cylindrical wall of the member is suitably perforated to allow the oil in the bottom of the case to pass into the chamber formed thereby. In order to prevent the sump and heavier oil and sediment from passing into the well and clogging the pipe 24 a surrounding screen 30 is provided. This screen is of a mesh which will permit the oil to pass into the well and at the same time is not liable to become clogged. A cover plate 31 closes the upper end of the well and through it the downwardly extending portion of the pipe 24 projects.

In order to further secure this lower end of the pipe in a rigid manner a strap iron 32 is secured to one of the extensions of the lower casting and extends downwardly toward the pipe. The lower end of this strap is formed with a loop through which the pipe passes and into which the pipe is temporarily clamped by a clamping bolt 33. This bolt may be readily removed to permit the pipe to pass from the loop when it is desired to disassemble the transmission.

Figure 2:
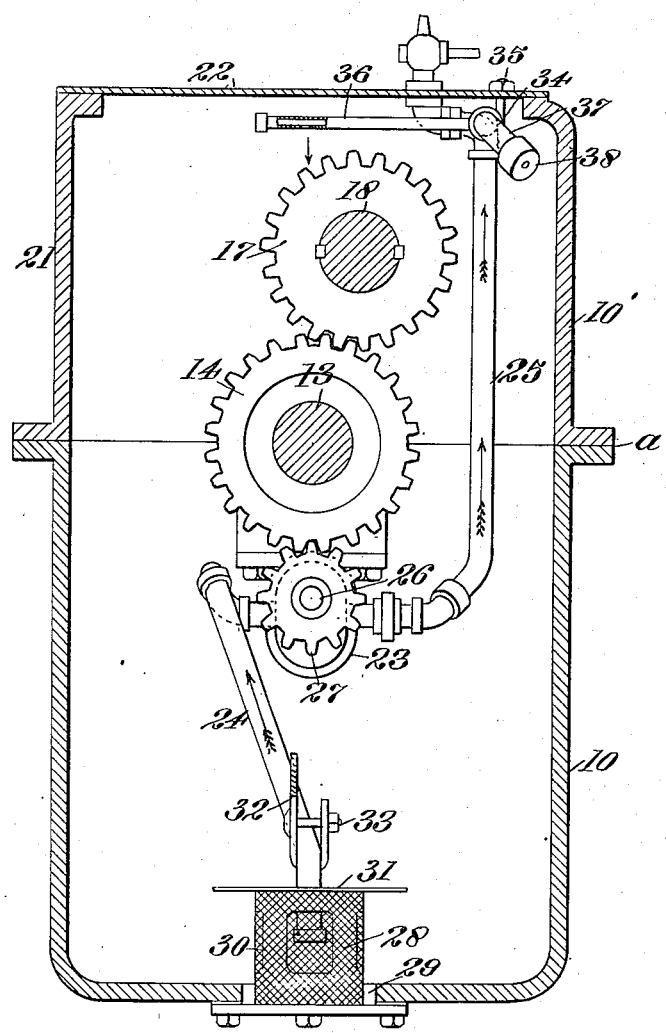
Fig. 2 is a view in vertical section and elevation, as seen on the line 2—2 of Fig. 1 and discloses the complete piping arrangement of the system as well as the pump drive.
Figure 3:
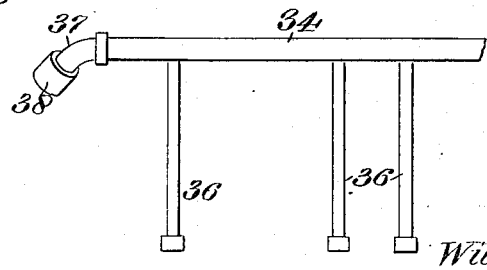
Fig. 3 is a fragmentary view in plan, illustrating the horizontal outlet pipe equipped with the spray nozzles.

The eduction pipe 25, which extends upwardly from the pump 23, passes alongside the gears 14 and 17, as clearly shown in Fig. 2 and terminates at a point directly beneath the cover plate 22 and at one end thereof. At this point a horizontally extending distributing pipe 34 is fastened to the pipe 25 and carried along the cover plate U-bolts 35 are provided to hold this pipe in position. The distributing pipe 34 is perforated at desirable intervals along its length agreeing with the position of the gears therebeneath. These perforations are provided to receive delivery tubes 36 which extend at right angles to the distributing pipe 34 and overhang the gears. The under faces of these tubes are perforated to form an oil outlet and to deliver a stream of oil directly upon the rotating gears.

The outer terminating end of the distributing pipe 34 is formed with an L-shaped extension 37, which is bent downwardly and acts as a distributing nozzle for certain gears of the transmission. The lower end of this extension is covered by a perforated cap 38 which restricts the flow of oil and maintains the pressure in the eduction pipe line.

In the operation of this device the main shaft of the transmission is rotated by a suitable source of power and will in turn operate the driving gear 27 of the pump. This will cause oil to be drawn from the well in the bottom of the case upwardly along the pipe 24 and thereafter ejected from the pipe into the eduction pipe 25. From this pipe it will be distributed to the various delivery tubes 36 along the distributing pipe 34. In this manner a constant and adequate stream of oil will be thrown upon the various gears of the transmission gear set and will ensure that all of the bearings, as well as the surfaces of the moving parts, will be properly lubricated.

When it is desired to disassemble the transmission, the bolts holding the lower case casting 10 and the upper casting 10' are removed to cause the case to separate on the line a, as particularly shown in Fig. 2. When the upper case portion is lifted the shafts 13 and 18 will be lifted also as their bearings are permanently secured within this upper case. By releasing the clamping bolt 33 of the strap 32 the pipe 24 may be easily withdrawn from the strap and will ensure that the gear trains of the transmission and the entire oiling system may be removed bodily coincident with the removal of the case.

While I have shown the preferred form of my invention as now known to me, it will be understood that various changes in the construction, arrangement and combination of parts may be made by those skilled in the art without departing from the spirit of the invention.

Having thus described my invention, what I claim and desire to secure by Letters Patent is—

1. In a two-part transmission case, an oiling system adapted to be enclosed thereby and suspended from the upper removable portion of said case and in communication with the lower case portion, said system being of unitary construction and movable bodily with the upper portion of the case.

2. In a transmission mechanism comprising a set of transmission gears, shafts therefor and a two-part casing adapted to enclose the gears of a strainer well positioned within the lower of said casing parts, an oiling system in communication with said strainer well and adapted to deliver oil therefrom to the upper casing part, said system being of unitary construction, and connecting means therefor securing the system to the upper casing part whereby it may be moved bodily therewith.

3. In a transmission mechanism, a housing, a removable cover therefor, a variable speed gear transmission mechanism journaled in and carried by the cover, and a unitary oiling system for the transmission mechanism also carried by the cover and removable therewith.

4. In a transmission mechanism, a housing, a removable cover therefor, a variable speed gear transmission mechanism journaled in and carried by the cover, an oil circulating pump also carried by the cover and driven by the transmission mechanism, a spray pipe connected with the discharge of the pump, adapted to project the spray of oil on the gears of the transmission, and a suction pipe connected with the suction side of the pump extending downwardly into a well formed in the bottom of the housing of the transmission, said suction and said spraying pipe being secured to the cover and removable therewith.

5. In a transmission mechanism, a housing, a removable cover therefor, a variable speed gear transmission mechanism journaled in and carried by the cover, an oil circulating mechanism carried by the cover and driven by the transmission, a spray pipe secured to the cover connected with said oil circulating mechanism, and a suction pipe secured to the cover connected with the oil circulating mechanism, said suction pipe having its lower end extending into a well formed within the housing and freely removable from the well.

6. In a transmission mechanism, a housing, a removable cover therefor, a variable speed gear transmission mechanism journaled in and carried by the cover, an oil circulating mechanism carried by the cover and driven by the transmission, a spray pipe secured to the cover connected with said oil circulating mechanism, a suction pipe secured to the cover connected with the oil circulating mechanism, said suction pipe having its lower end extending into a well formed within the housing and freely removable from the well, and means for straining the oil before it returns to the well.

7. In a transmission mechanism, a housing, a variable speed gear transmission mechanism journaled in the housing, and a force feed oil circulating pump mounted within the housing and driven by the transmission mechanism to circulate a lubricant within the housing, a distributing pipe communicating with the pump, and a series of delivery tubes communicating with the distributing pipe, each tube extending over a set of gears in the housing and being in the same plane therewith.

8. In a transmission mechanism, a two-part housing, designed to contain oil normally at a certain level, variable speed gear transmission mechanism carried on a plurality of superimposed shafts journaled in said housing, the uppermost gears being out of contact with said oil, a well formed in the bottom of the housing, means to strain the oil entering the well from the housing, a force feed pump operatively connected to one of the gears in the housing and drawing its supply from the well, and means connected with the pump for distributing the oil therefrom on the uppermost gears.

In testimony whereof I have hereunto set my hand in the presence of two subscribing witnesses.

WILLIAM TURNBULL.

Witnesses:
 EMIL F. NORELIUS,
 H. B. BAKER.